United States Patent [19]

Wenzel et al.

[11] 3,929,955

[45] Dec. 30, 1975

[54] PROCESS FOR PRODUCING AGGLOMERATES FROM FINE-GRAINED LIGNITE OR FINE GRAINED CARBONIZED LIGNITE OR FROM MIXTURES OF THE TWO

[75] Inventors: Werner Wenzel, Aachen; Peter Speich, Cologne; Roman Kurtz, Frechen; Heinrich Gudenau; Friedrich Franke, both of Aachen, all of Germany

[73] Assignees: Rheinische Braunkohlenwerke AG, Cologne; Werner Wenzel, Aachen, both of Germany

[22] Filed: May 15, 1973

[21] Appl. No.: 360,514

[30] Foreign Application Priority Data
June 8, 1972 Germany............................ 2227812

[52] U.S. Cl. ................................................. 264/117
[51] Int. Cl.² .............................................. B01J 2/28
[58] Field of Search ................ 264/117; 23/314, 313

[56] References Cited
UNITED STATES PATENTS
3,665,066  5/1972  Capes et al. ......................... 264/117

OTHER PUBLICATIONS

Agglomeration, Chem. Engng. Mag., Dec. 4, 1967, pp. 154, 155, 168, 169, McGraw-Hill Pub. Co., New York.

*Primary Examiner*—Robert F. White
*Assistant Examiner*—J. R. Hall
*Attorney, Agent, or Firm*—Sughrue, Rothwell, Mion, Zinn & Macpeak

[57] ABSTRACT

A process for producing agglomerates from fine-grained lignite or fine-grained carbonized lignite or from mixtures of the two, characterized in that the fine-grained material is pelletized using a pellet forming agent and, where required, water. Suitable pellet forming agents include clays, cements, water glass and calcium-containing materials. The agglomerates produced by the process of this invention have a grain size and grain hardeners that renders them suitable for a variety of uses, such as the production of fertilizers with a lignite base, the production of adsorption agents, and the reduction or centering of iron ores.

7 Claims, No Drawings

PROCESS FOR PRODUCING AGGLOMERATES FROM FINE-GRAINED LIGNITE OR FINE GRAINED CARBONIZED LIGNITE OR FROM MIXTURES OF THE TWO

BACKGROUND OF THE INVENTION

1. Field of the Invention

The present invention relates to a process for producing agglomerates from fine-grained lignite or fine-grained carbonized lignite and from mixtures of the two.

2. Prior Art

It is known in the art to produce agglomerates from the above-mentioned materials by making them into briquettes. However, the briquetting process is fairly costly and is only feasible if the end product, i.e., the briquettes, are being sold as a high grade fuel capable of commanding a price, which will cover the cost of the briquetting process.

However, lignite and carbonized lignite may also be used for other purposes where agglomerates are required, but where, for reasons of cost and/or reasons relating to the grain solidity, it is not feasible to produce briquettes. Alternative uses for lignite and carbonized lignite are the production of fertilizers with a lignite base, the production of adsorption agents, the production of reduction agents, for example for the direct reduction or sintering of iron ores. Furthermore, the improvement in transporting and storage possibilities may, under certain circumstances, render the production of agglomerates an expediency whereas, for the reasons indicated above, the production of briquettes is not absolutely essential, or is too costly.

SUMMARY OF THE INVENTION

The object of the invention is to obviate the above disadvantages and to develop a process for producing agglomerates from fine-grained lignite and fine-grained carbonized lignite. This process is designed to provide end products capable of satisfying all practical requirements with regard to grain size and grain hardness. It should also be possible to optimally adapt the resultant pile of pellets to the intended application, insofar as the solidity of the pellet, the grain size and grainsize distribution are concerned. Accordingly, over and above the production of agglomerates, the invention offers the possibility of producing products with a lignite base having specific properties for a wide range of applications.

To solve this problem according to the invention, it is proposed to render lignite or carbonized lignite into pellet form using a pellet forming additive, and, if necessary, water. The lignite in question is crude lignite, which may be somewhat dried out, dry lignite and lignite dust. In the latter two cases, the moisture content is normally so low that a specific amount of water has to be added in addition to the actual pellet forming additive. The same applies to carbonized lignite. However, crude lignite already contains up to 60% water from its seams, so that under certain circumstances it is unnecessary to add any water. Even in the case of crude lignite, a small quantity of water will have to be added in many cases.

The fine-grained starting material will generally have a grain size in the main less than 0.5 mm, in the case of crude lignite of 1 – 2 mm. The agglomerates produced, i.e., the material in pellet form, will then have a grain size of ca. 0.5 – 5mm, and possibly up to and exceeding 10mm. The grain size of the pellets depends largely on the particular application. Carbonized lignite in pellet form, which is used, for example, for sintering iron ores, frequently has a grain size of in the main 0.5 – 3mm. Grain sizes of more than 10mm may be required if the pelleted material - whether it is lignite or carbonized lignite, is used for adsorption purposes, for example, for purifying waste water or the like. These larger pellets may also be used together with pellets having a smaller diameter.

Next to water, the pellet forming additive is particularly important, especially with regard to the forming of pellets and the physical and mechanical properties of these pellets. Organic and inorganic products such as clays, cements, water glass and calcium containing products are all pellet forming additives, which are latently hydraulic; the Ca and Mg constituents of the pellet additives reacting with the silica constituents of the lignite or carbonized lignite. These additives produce bonds within the pellets and accordingly are responsible for the strength of the pellet. The use of lignite filter ash as a pellet additive has been found to be particularly advantageous. The ash in question is very fine-grained and is produced when lignite or carbonized lignite are burned. The ash is generally extracted in a flue by means of a filter, preferably an electrofilter. This lignite filter ash is an extremely inexpensive material and furthermore, it is readily available in sufficient quantities in the very areas where the processing of lignite into pellets is a feasible proposition.

The pellet forming action of the lignite filter ash is due to the fact that the lignite filter ash contains quicklime (CaO) which is converted into hydrate of lime $Ca(OH)_2$ in the course of the pellet forming process by the water, which is either already present or which is added. The hydrate of lime $Ca(OH)_2$ is converted into $CaCO_3$ by the action of $CO_2$ and is solidified thereby. The disadvantage of this process is that it takes at least a number of hours. It may be accelerated by means of a thermal aftertreatment, preferably using flue gas containing $CO_2$. In addition, another part of the quicklime (CaO) contained in the ash reacts during the combustion process with the sodium containerd in the lignite, with the result that anhydrous calcium sulphate $(CaSO_4)$ or gypsum $(CaSO_4.H_2O)$ is formed. If only anhydrous calcium sulphate is present, this may be converted into gypsum by the addition of water for forming the pellets. When the pellets are dried, the water is removed from the gypsum with the result that calcium sulphate forms again, thereby contributing to the solidification of the pellet structure. The pellets may also be thermally dried to accelerate the hardening process. In view of the fact that in many cases it will be necessary to carry out a drying process to reduce the water content of the pellets, this cannot be regarded as complicating the overall process.

Furthermore, in the same way as the pellet additives mentioned above, the use of lignite filter ash makes it possible to regulate in advance the desired mechanical, chemical and physical properties of the pellets. This feature may be particularly useful when the pellets are used as a reduction agent for the direct reduction of iron ores, as an excess of Ca is required in rotating cylindrical furnaces in which reduction takes place. The same may also apply when the end product is used as fertilizer, as, depending on existing conditions, Ca often has to be added to many soils or a specific Ph value has to be obtained. In these cases, the pellet additive is not merely a necessary agent for the production of pellets. The pellet additive itself has a specific function with regard to the particular application for which the pellets are intended.

Organic pellet additives such as varieties of pitch, oils, resins, asphalt, dextrine, sulfite waste liquors and cellulose may also have additional uses. These pellet additives are generally more expensive than lignite filter ash and similar products. Their use will generally depend on the application of the end product and the price which can be obtained for it. It is further possible to use the more expensive pellet additives when very small relative amounts of the additive are required to obtain the desired quality of the product.

According to another proposal according to the invention, additives may also be added to the material to be made into pellets. This is particularly feasible in the case of dried lignite or carbonized lignite. It will generally not be necessary in the case of crude lignite which still has its natural water content or at least part thereof. Neither will it be necessary when additional water has to be added. This applies in particular to the formation of pellets from fine-grained carbonized lignite where half the water content needed for the pellet forming process may amount to ca. 12% by weight. If, in connection with the latter case, the term "forced" is used, this means that the water is mixed with the fine-grained material in mixers to obtain uniform distribution of the water in the material. The material, which has been provided with half the water in this way, can be given the remainder of the water on the pellet forming plate by spraying the water onto the material to be made into pellets.

It has already been mentioned that fertilizers may be produced with lignite, more particularly crude lignite, as a base. Regulation of the end product may be achieved by adding clear slime, which may possibly also add a certain amount of water to the material to be made into pellets. This slime may also be used as a pellet additive, possibly together with other additives. Similarly, in this case, it is possible to process inexpensive materials - lignite, more particularly crude lignite and clear slime and, without using large quantities of expensive materials, to form a product which may be marketed profitably, even if it is sold at a relatively low price.

It may be necessary to employ high temperatures, e.g., 80°C when mixing the individual constituents, i.e., the fine-grained materials with oils, liquid pitch, liquid asphalt, sulfite waste liquors, etc., and/or during the subsequent pellet forming process. The reason for this is to achieve maximum malleability of the material to be made into pellets. This is particularly applicable when making pellets from carbonized lignite.

As has already been stated, specific hardening mineral binding agents such as clays, montmorillonite, bentonite, cements, hydrate of lime, calcium oxide, etc., may be used as pellet additives for hardening the pellets. These hardening constituents may be added to the fine-grained material either before it is moistened, or after the moistening process and should be as well distributed as possible. After the fashioning process and after hardening the pellets by drying them and/or employing thermal treatment or other chemical setting processes, the hardening constituents form a rigid cohesive framework within the pellet.

It is known that combustive fuels having low reactivity are more suitable for the sintering process than fuels having high reactivity. The process according to the invention makes it possible to advantageously adapt fuels having high reactivity, such as lignite or carbonized lignite, to the requirements of the sintering operation. The reactivity of the lignite or carbonized lignite is reduced by the addition of the mineral binding agents. If the reactivity is still too high, it is possible to further reduce it by incorporating (adding) mineral substances in (to) the pellet. These substances in themselves are not necessary for the solidity of the pellet and do not contribute to the same but they are such that they have a positive effect on the subsequent processes, for example, the subsequent process of smelting the iron ore sinter. This applies to the admixture of calcium ($CaCO_3$), of slags with an excess of calcium oxide, fine ores, etc.

Another measure according to the invention for simultaneously increasing the solidity of the pellet and/or reducing its reactivity, may consist in producing mineral shells about the actual pellet. These so-called shell pellets may be produced in a known way on a pellet molding plate having a so-called powder rim. The powder rim contains the material for forming the shell. The latter may be hydrate of lime, cement, fine ore, converter dust or the like.

The process according to the invention is further illustrated in the following Examples:

EXAMPLE 1

An iron ore having the following constituents is subjected to a sintering operation:

| | |
|---|---|
| Fe | 57.41% |
| $SiO_2$ | 5.72% |
| $Al_2O_3$ | 1.88% |
| MgO | 1.11% |
| CaO | 3.72% |

In the main, the iron is present in the form of hematite ($Fe_2O_3$). Carbonized lignite having the following composition is used as the sintering fuel:

| | |
|---|---|
| C | 80% |
| Ash | 12% |
| Volatile constituents | 8% |

95% of the carbonized lignite has a grain size of under 0.5 mm. The sinter mixture consists of ore with 40% residual material, 10% fuel, and 7.8% water.

Residual material refers to any fine-grained constituents which have already been subjected to a sintering process.

The mixing or rolling process was carried out in an Eirich mixer for 4 minutes. Sintering took place in an experimental sintering pan having a 30cm layer height and a vacuum of 800 mm of water. The sintering time was 28 minutes.

This sintering process produced only a very loose sinter cake practically unsuited for use in the blast furnace as it easily falls apart.

EXAMPLE 2

The same ore and the same fuel as in Example 1 were used. The fuel was pretreated or forcibly lubricated with 12% by weight water in an Eirich mixer. The moistened fuel was then placed on a pellet molding plate and sprayed with a further 12% by weight water. The pellet forming process was ceased as soon as predominantly small pellets ca. 1 – 3 mm in size had formed. 10% of the small fuel pellets were added to the ore to be sintered. Sintering of the sintering material thus obtained was conducted in the same device and using the same method as in Example 1. The sintering process took 23 minutes. The sinter cake thus obtained was cohesive, possessed good porosity and no slag corrosions. The hardness of the cake was sufficiently high to ensure a good transporting capability and favorable blast furnace performance.

EXAMPLE 3

The production of pellets from crude lignite and clear slime with filter ash.
Grain size of the crude lignite: 0 – 1mm
Moisture content of the crude lignite: 59.7%
Grain size of the pellet produced: 1 – 5mm

| Constituents of the mixture | Solidity of the Pellets |
| --- | --- |
| a) 930 kg crude lignite<br>50 kg clear slime<br>20 kg filter ash | 390 g |
| b) 880 kg crude lignite<br>100 kg clear slime<br>20 kg filter ash | 410 g |
| c) 910 kg crude lignite<br>50 kg clear slime<br>40 kg filter ash | 710 g |
| d) 800 kg crude lignite<br>100 kg clear slime<br>40kg filter ash | 690 g |

EXAMPLE 4

The production of pellets from dry lignite
Grain size of the dry lignite: under 0.5 mm
Moisture content of the dry lignite: 17.3%
Grain size of the pellets produced: 0.5 – 5 mm

| Constituents of the Mixture | Solidity of the Pellets |
| --- | --- |
| a) 975 kg dry lignite<br>25 kg filter ash<br>250 kg water | 98 g |
| b) 950 kg dry lignite<br>50 kg filter ash<br>250 kg water | 106.5 g |
| c) 900 kg dry lignite<br>100 kg filter ash<br>250 kg water | 116 g |

EXAMPLE 5

The production of pellets from lignite-electrofilter dust with lignite filter ash.
Grain size of the lignite - electrofilter dust: 80% smaller than 100 μm (0,1 mm)
Moisture content of the lignite electro-filter dust: 10%

| Constituents of the Mixture | Solidity of the Pellets |
| --- | --- |
| a) 1000 kg lignite dust<br>250 kg water | 25 g |
| b) 950 kg lignite dust<br>50 kg filter ash<br>250 kg water | 55 g |
| c) 900 kg lignite dust<br>100 kg filter ash<br>250 kg water | 60 g |
| d) 850 kg lignite dust<br>150 kg filter ash<br>250 kg water | 75 g |

EXAMPLE 6

The production of pellets from carbonized lignite dust. Grain size of the carbonized lignite dust: 0 – 0.5 mm. Water content of the dust: 1%.

| Constituents of the Mixture | Solidity of the Pellets |
| --- | --- |
| a) 950 kg carbonized lignite dust<br>50 kg filter ash<br>350 kg water | 450 g |
| b) 900 kg carbonized lignite dust<br>100 kg filter ash<br>350 kg water | 510 g |
| c) 850 kg carbonized lignite dust<br>150 kg filter ash<br>350 kg water | 650 p |

All the solidity values indicated in Examples 3 – 6 related to dried pellets with a 3 mm grain diameter and 10% residual moisture content.

The above Examples show that it is possible to produce pellets from fine-grained lignite or fine-grained carbonized lignite with usable and, in part, very good results. This also applies to the production of pellets from a mixture of lignite and carbonized lignite with which a good end product may be obtained using water and lignite filter ash. Mixed pellets will be particularly advantageous for the direct reduction of, for example iron ores, as they make it possible to adjust the part of the carbon, which is in solid form (non-volatile) to an optimum value. Mixed pellets may also be used advantageously as an adsorption agent; the lignite part of the pellet acting mainly as an ion exchanger and the carbonized part acting as the actual adsorption agent.

What is claimed is:

1. A process for producing pellets from fine-grained carbonized lignite having a grain size less than 0.5 mm. comprising mixing said carbonized lignite with a pellet-forming agent consisting of lignite filter ash and water, subjecting the mixture to a pelletizing action including a further addition of water to pelletize it and produce pellets of a larger size than said fine-grained carbonized lignite and drying said pellets to harden them.

2. The process of claim 1 wherein said carbonized lignite and a wetting agent therefor are mixed therewith during the pellet-producing process.

3. The process of claim 1 wherein about half of the water required for the pellet-forming process is forceably mixed with the fine-grained material before the pellet-forming process is carried out.

4. The process of claim 1 wherein said drying is carried out by a thermal treatment.

5. The process of claim 1 wherein said pellets have a grain size over 10 mm.

6. The process of claim 1 wherein said produced pellets have a grain size of up to 10 mm.

7. The process of claim 1 wherein the produced pellets have a grain size of 0.5 – 5 mm.

* * * * *